US010986066B2

(12) United States Patent
Gwock et al.

(10) Patent No.: US 10,986,066 B2
(45) Date of Patent: Apr. 20, 2021

(54) SYSTEMS, APPARATUSES, METHODS, AND NON-TRANSITORY COMPUTER READABLE MEDIA FOR EFFICIENT CALL PROCESSING

(71) Applicant: LINE Corporation, Tokyo (JP)

(72) Inventors: Jung nam Gwock, Seongnam-si (KR); HyunKook Choi, Seongnam-si (KR)

(73) Assignee: LINE CORPORATION, Tokyo (JP)

( * ) Notice: Subject to any disclaimer, the term of this patent is extended or adjusted under 35 U.S.C. 154(b) by 383 days.

(21) Appl. No.: 15/201,844

(22) Filed: Jul. 5, 2016

(65) Prior Publication Data

US 2017/0093791 A1 Mar. 30, 2017

(30) Foreign Application Priority Data

Sep. 25, 2015 (KR) .................. 10-2015-0136898

(51) Int. Cl.
*H04L 29/12* (2006.01)
*H04L 29/06* (2006.01)
*H04L 29/08* (2006.01)

(52) U.S. Cl.
CPC ...... *H04L 61/2007* (2013.01); *H04L 65/1006* (2013.01); *H04L 67/141* (2013.01); *H04L 67/26* (2013.01)

(58) Field of Classification Search
CPC ... H04L 12/1818; H04L 51/34; H04L 51/046; H04L 61/2007; H04L 65/1006; H04L 65/1016; H04L 65/1069; H04L 67/26; H04L 67/141; H04M 3/42195; H04M 7/0057; H04M 7/0075; H04M 7/0084; H04M 3/46; H04M 3/42042; H04N 21/433; H04N 21/43615; H04W 4/14; H04W 4/16; H04W 4/10
See application file for complete search history.

(56) References Cited

U.S. PATENT DOCUMENTS

| 8,880,664 B1 * | 11/2014 | Tekle ................. H04L 41/0803 709/223 |
| 2009/0238358 A1 * | 9/2009 | Ramanathan ........... H04M 3/46 379/221.03 |
| 2011/0202956 A1 * | 8/2011 | Connelly ............. H04N 21/433 725/38 |

(Continued)

FOREIGN PATENT DOCUMENTS

WO WO-2015/065001 A1 5/2015

*Primary Examiner* — Nicholas R Taylor
*Assistant Examiner* — Michael Li
(74) *Attorney, Agent, or Firm* — Sughrue Mion, PLLC

(57) ABSTRACT

A system and method for efficient call processing is provided. The system of a server implemented with a computer includes a memory configured to store a computer-readable instruction and at least one processor configured to execute the computer-readable instruction. The at least one processor includes a push request controller configured to control the server to request a push server to provide push notification to a terminating electronic device corresponding to an outgoing request of an originating electronic device and a call management controller configured to control the server to establish a call session between the originating electronic device and the terminating electronic device based on an invite request sent from the terminating electronic device based on the push notification.

14 Claims, 10 Drawing Sheets

(56) References Cited

U.S. PATENT DOCUMENTS

| | | | |
|---|---|---|---|
| 2011/0252146 A1* | 10/2011 | Santamaria | H04M 7/0057 709/227 |
| 2012/0294302 A1* | 11/2012 | Ku | H04L 65/1016 370/352 |
| 2013/0260893 A1 | 10/2013 | Shin et al. | |
| 2013/0332543 A1 | 12/2013 | Shin et al. | |
| 2014/0019540 A1 | 1/2014 | Shin et al. | |
| 2014/0051474 A1* | 2/2014 | Ross | H04W 4/10 455/518 |
| 2015/0031341 A1* | 1/2015 | Bar On | H04M 3/42195 455/414.1 |
| 2016/0241607 A1* | 8/2016 | Goloshubin | H04L 65/1069 |
| 2016/0337825 A1* | 11/2016 | Piscopo, Jr. | H04W 4/16 |

\* cited by examiner

SYSTEMS, APPARATUSES, METHODS, AND NON-TRANSITORY COMPUTER READABLE MEDIA FOR EFFICIENT CALL PROCESSING

CROSS-REFERENCE TO RELATED APPLICATION

This U.S. non-provisional application claims the benefit of priority under 35 U.S.C. § 119 to Korean Patent Application No. 10-2015-0136898 filed on Sep. 25, 2015, in the Korean Intellectual Property Office (KIPO), the entire contents of which are hereby incorporated by reference.

BACKGROUND

One or more example embodiments of the inventive concepts described herein relate to systems, apparatuses, methods and/or non-transitory computer readable media for efficient call processing.

A session initiation protocol (SIP) is a communication protocol used to interwork between a plurality of communication equipment in a voice over internet protocol (VoIP) environment. SIP is based on a client/server structure in which a server (e.g., a VoIP server or a SIP server) responds to a call if one or more clients initiates a call and/or communication session.

Each of the originating electronic devices that want to perform call origination in a SIP environment may send an invite request to the server. The server generates and manages a SIP dialog based on the invite request. This SIP dialog indicates a relationship between two or more SIP user agents (e.g. an originating client and a terminating client) which are present during a certain time. SIP message sequence information, SIP request routing information, and the like transmitted between an originating electronic device and a terminating electronic device are managed by the SIP dialog. Herein, the SIP user agent may be a device which may perform SIP processing. Each of the originating client, the terminating client, and the SIP server may correspond to the SIP user agent.

This SIP dialog includes context for translating a SIP message. Each of the SIP user agents manages a SIP dialog through a dialog identifier (ID). The SIP dialog includes one or more SIP transactions (e.g., SIP request messages and/or SIP response messages). A SIP method of generating this SIP dialog includes an invite method and a subscribe method. The invite method is used to establish a call session.

In other words, equipment (e.g., the originating client, the terminating client, or the SIP server) for SIP call processing generate and manage a SIP dialog based on an invite request. The SIP dialog is terminated together with a call BYE message such as a BYE request or an invite error response. According to at least one example embodiment, each of the SIP user agents should manage a SIP dialog to process a subsequence SIP request generated during a life-cycle of a SIP dialog.

The invite request in the SIP is a SIP method of generating a SIP call. In the related art, an originating electronic device sends an invite request to a SIP server for an outgoing request. The SIP server sends the received invite request to a terminating electronic device to provide notification that a call invite request has been received. Since each SIP user agent generates a SIP dialog based on this invite message, the SIP server should generate and manage a SIP dialog in proportion to the number of calls being processed by the SIP server. For example, if ten thousand invite requests are generated for one second, the SIP server should generate and manage ten thousand SIP dialogs for one second. Therefore, efficient management of a SIP dialog in the SIP server has a great influence on the performance of capacity of the SIP server.

SUMMARY

Various example embodiments of the inventive concepts provide a system, apparatus, method, and/or non-transitory computer readable medium for reducing the number of times a SIP dialog is generated and thereby considerably improving the performance and capacity of a SIP server (and/or a voice over internet protocol (VoIP) server) by generating an invite request only when the terminating electronic device accepts a call connection.

One aspect of at least one example embodiment of the inventive concepts is directed towards providing a call processing system. The system may include a memory having computer-readable instructions stored thereon, and at least one processor configured to execute the computer-readable instructions to receive an outgoing request from an originating electronic device, transmit a push request to a push server to provide push notification to a terminating electronic device corresponding to the outgoing request of the originating electronic device, receive an invite request from the terminating electronic device in response to the push notification, and establish a call session between the originating electronic device and the terminating electronic device based on the invite request.

The at least one processor may be further configured to forward the invite request to the originating electronic device when the invite request is received from the terminating electronic device, and the originating electronic device may be configured to connect to the call session based on the invite request from the server.

The at least one processor may be further configured to generate a session initiation protocol (SIP) dialog based on the invite request received from the terminating electronic device and manage the SIP dialog between the terminating electronic device and the originating electronic device.

The at least one processor may be further configured to cancel call origination without generating a SIP dialog corresponding to the outgoing request, if an outgoing cancellation request is received from the originating electronic device before the invite request is received from the terminating electronic device.

The at least one processor may be further configured to cancel call origination without generating a SIP dialog corresponding to the outgoing request, if an incoming rejection request is received from the terminating electronic device before the invite request is received from the terminating electronic device.

Another aspect of at least one example embodiment of the inventive concepts is directed towards providing a call processing system. The system may include a memory having computer-readable instructions stored thereon, and at least one processor configured to execute the computer-readable instructions to receive a push notification request from a voice over internet protocol (VoIP) server based on an outgoing request received by the VoIP server from an originating electronic device, generate a push notification for a terminating electronic device in response to the outgoing request, and transmit the push notification to the terminating electronic device. The terminating electronic device may be configured to transmit an invite request to the VoIP server based on the push notification and the VoIP server may be configured to establish a call session between the originating electronic device and the terminating electronic device based on the invite request.

The VoIP server may be configured to transmit the invite request to the originating electronic device based on receiving the invite request from the terminating electronic device. The originating electronic device may be configured to connect to the call session based on an invite request from the server.

The VoIP server may be configured to generate a session initiation protocol (SIP) dialog based on receiving the invite request from the terminating electronic device.

The VoIP server may be configured to cancel call origination without generating the SIP dialog corresponding to the outgoing request, if the VoIP server receives an outgoing cancellation request from the originating electronic device before receiving the invite request from the terminating electronic device.

The VoIP server may be configured to cancel call origination without generating the SIP dialog corresponding to the outgoing request, if the VoIP server receives an incoming rejection request from the terminating electronic device before receiving the invite request from the terminating electronic device.

Another aspect of at least one example embodiment of the inventive concepts is directed towards providing a call processing method. The method may include receiving, using at least one processor, an outgoing request from an originating electronic device, requesting, using the at least one processor, a push notification from a push server to a terminating electronic device corresponding to the outgoing request, receiving, using the at least one processor, from the terminating electronic device an invite request in response to the push notification, and establishing, using the at least one processor, a call session between the originating electronic device and the terminating electronic device based on the invite request.

The establishing of the call session may include sending the invite request to the originating electronic device when the invite request is received from the terminating electronic device. The originating electronic device may be configured to connect to the call session based on an invite request from the VoIP server.

The method may further include generating, using the at least one processor, a session initiation protocol (SIP) dialog when the invite request is received from the terminating electronic device, and managing, using the at least one processor, the SIP dialog between the originating electronic device and the terminating electronic device.

The method may further include cancelling, using the at least one processor, call origination without generating a SIP dialog corresponding to the outgoing request, if an outgoing cancellation request is received from the originating electronic device before the invite request is received from the terminating electronic device.

The method may further include cancelling, using the at least one processor, call origination without generating a SIP dialog corresponding to the outgoing request, if an incoming rejection request is received from the terminating electronic device before the invite request is received from the terminating electronic device.

BRIEF DESCRIPTION OF THE FIGURES

Example embodiments will be described in more detail with regard to the figures, wherein like reference numerals refer to like parts throughout the various figures unless otherwise specified, and wherein.

Figure 1:
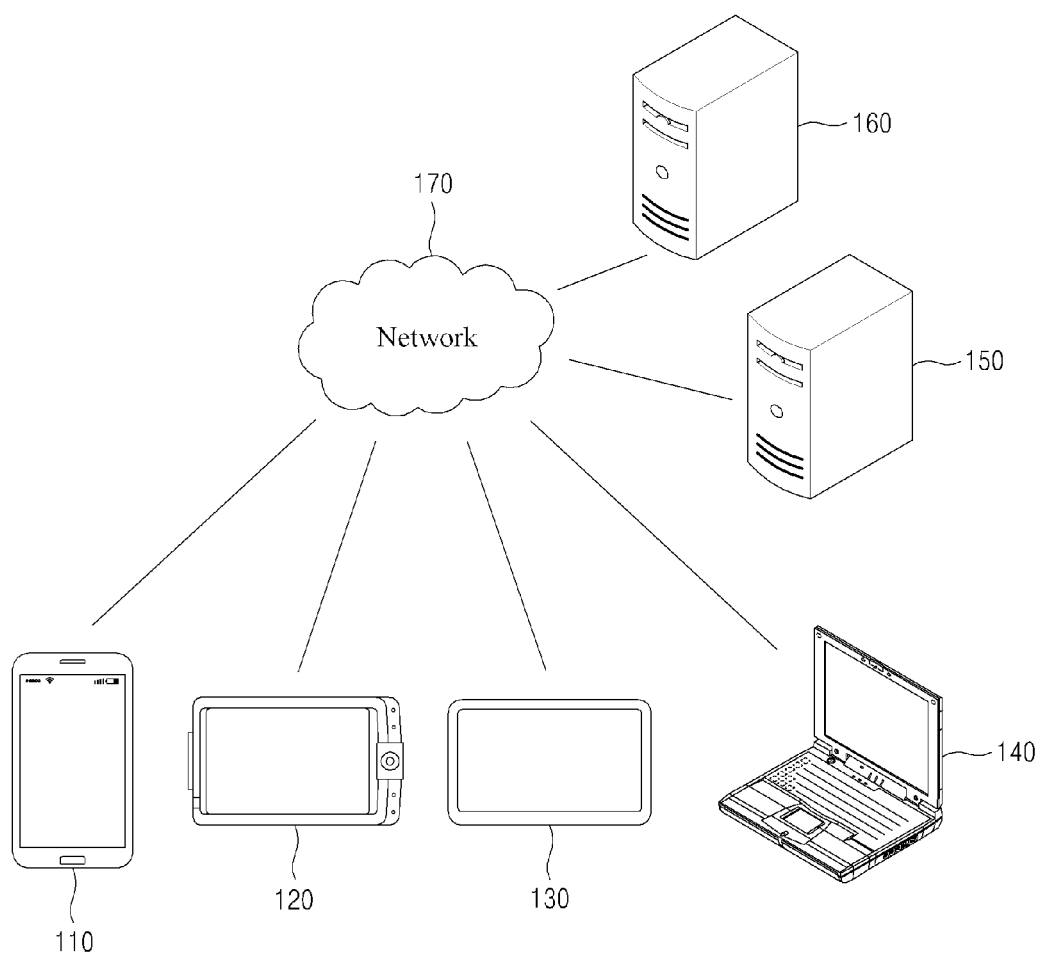
FIG. 1 is a drawing illustrating a network environment according to at least one example embodiment of the inventive concepts.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices.

The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

FIG. 1 is a drawing illustrating a network environment according to at least one example embodiment of the inventive concepts. In FIG. 1, a network environment may include a plurality of electronic devices 110 to 140, a plurality of servers 150 and 160, and a network 170. However, the number of electronic devices and the number of servers is not limited thereto and the network environment may contain a greater or lesser number of constituent elements, such as a single electronic device and/or a single server.

Each of the electronic devices 110 to 140 may be a fixed computing terminal and/or a mobile computing terminal. For example, the plurality of electronic devices 110 to 140 may be a smart phone, a mobile phone, a navigation device, a personal computer (PC), a laptop, a notebook, a digital broadcasting terminal, a personal digital assistant (PDA), a portable multimedia player (PMP), a tablet personal computer, a gaming console, a smart device, a wearable device, a virtual reality device, and the like. For example, the electronic device 110 may communicate with the other electronic devices 120 to 140 and/or the servers 150 and 160 through the network 170 using a wired or wireless communication scheme.

The scope and sprit of the inventive concepts may not be limited to a particular communication scheme. For example, there may be a communication scheme using a local area wireless communication network between devices (e.g., a wireless LAN network, a WiFi network, a cellular network, a satellite network, etc.) as well as a communication scheme using a communication network (e.g., a mobile communication network, a wired internet, a wireless internet, and a broadcasting network) which may be included in the network 170. For example, the network 170 may include one or more of networks, such as a personal area network (PAN), a local area network (LAN), a campus area network (CAN), a metropolitan area network (MAN), a wide area network (WAN), a broadband network (BBN), and/or the Internet, etc. Also, the network 170 may include, but is limited to, one or more of network topologies which include a bus network, a star network, a ring network, a mesh network, a star-bus network, a tree or hierarchical network, and the like.

Each of the servers 150 and 160 may be implemented with a computer device or a plurality of computer devices which may communicate with the plurality of electronic devices 110 to 140 through the network 170 to provide an instruction, a code, a file, content, a website, a service, and the like to the plurality of electronic devices 110 to 140.

For example, the server 160 may provide a file for installing an application to the electronic device 110 connected through the network 170. According to at least one example embodiment, the electronic device 110 may install the application using the file provided from the server 160. Also, the electronic device 110 may connect to the server 150 under control of an operating system (OS) and at least one program (e.g., a browser or the installed application) included in the electronic device 110 and may receive a service or content provided from the server 150. For one example, if the electronic device 110 sends a service request message to the server 150 through the network 170 under control of the application, the server 150 may send a code corresponding to the service request message to the electronic device 110. The electronic device 110 may configure and display a screen corresponding to the code under control of the application to provide content to its user. For another example, the server 150 may establish a communication session for a messaging service and may route a message between the plurality of electronic devices 110 to 140 through the established communication session.

Particularly, in at least one example embodiment of the inventive concepts, the server 150 may be a VoIP server (and/or a SIP server) which performs call processing between at least one call originating electronic device, such as the electronic device 110, and at least one call terminating electronic device, such as the electronic device 120. The server 160 may be a push server which sends push notifications to the terminating electronic device 120.

Figure 2:
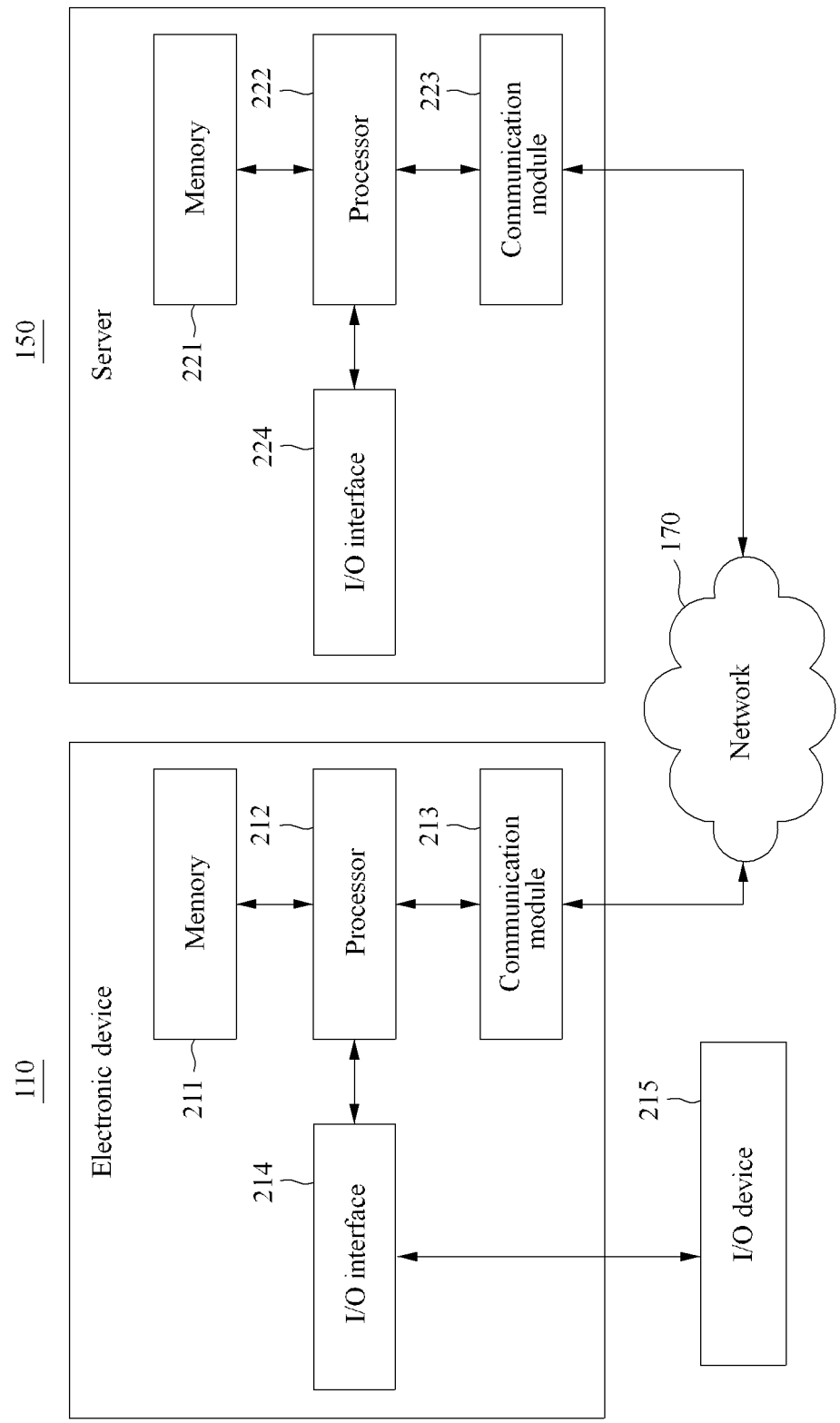
FIG. 2 is a block diagram illustrating a configuration of an electronic device and a configuration of a server according to at least one example embodiment of the inventive concepts.

FIG. 2 is a block diagram illustrating a configuration of an electronic device and a configuration of a server according to at least one example embodiment of the inventive concepts. In FIG. 2, an electronic device, such as electronic device 110 of FIG. 1, and one server, such as server 150 of FIG. 1, are depicted. Components of the electronic device 110 may be the same or similar to the components of the other electronic devices 120 to 140 of FIG. 1, and components of the server 150 may be the same or similar to those of the other server 160 of FIG. 1.

The electronic device 110 may include a memory 211, at least one processor 212, a communication module 213, and an input and output (I/O) interface 214. The server 150 may include a memory 221, at least one processor 222, a communication module 223, and an input and output (I/O) interface 224. Each of the memories 211 and 221 may be a non-transitory computer-readable recording medium and may include a permanent mass storage device such as a random access memory (RAM), a read only memory (ROM), and/or a disc drive (e.g., a solid state drive, a hard disc drive, etc.). Also, the memory 211 may store an operating system (OS) and at least one program code (e.g., a code for a browser or application installed and driven in the electronic device 110). These software components may be loaded from a non-transitory computer-readable recording medium, which is independent of the memories 211 and 221, using a drive mechanism. This non-transitory computer-readable recording medium may include a floppy disk, a tape, a digital versatile disc/compact disc-ROM (DVD/CD-ROM) disk, a flash memory card, etc. In at least one example embodiment, the software components may be loaded into the memories 211 and 221 through the communication modules 213 and 223, respectively, rather than a non-transitory computer-readable recording medium. For example, at least one program may be loaded into each of the memories 211 and 221 based on a program (e.g., the above-mentioned application) installed by files provided through the network 170 by developers and/or a file distribution system (e.g., the above-mentioned server 160), which distributes a file for installing an application.

Each of the processors 212 and 222 may be configured to process a computer readable instruction of a computer program by performing basic arithmetic, logic, and input and output operations. The instruction may be provided to the processor 212 by the memory 211 and/or the communication module 213. The instruction may be provided to the processor 222 by the memory 221 and/or the communication module 223. For example, each of the processor 212 and 222 may be configured to execute a computer readable instruction received based on a program code stored in a storage device such as the memories 211 and 221.

Each of the communication modules 213 and 223 may provide a communication function such that the electronic device 110 and the server 150 communicate with each other through the network 170 and may provide a communication function such that another electronic device (e.g., the electronic device 120) and/or another server (e.g., the server 160) communicates with each other through the network 170 (e.g., a wireless and/or wired network). For example, a request (e.g., a streaming service request for content) generated by the processor 212 of the electronic device 110 based on a program code stored in a non-transitory computer storage device, such as the memory 211, may be transmitted to the server 150 through the network 170 under control of the communication module 213. In contrast, a control signal or instruction, content, a file, a website, and the like provided under control of the processor 222 of the server 150 may be received in the electronic device 110 through the communication module 213 of the electronic device 110, through the communication module 223 and the network 170. For example, the control signal or instruction of the server 150, received through the communication module 213, may be sent to the processor 212 or the memory 211. The content, file, etc., of the server 150 may be stored in a non-transitory computer storage medium which may be further included in the electronic device 110.

The input and output interface 214 may be a means for interfacing with at least one input and output device 215. For one example, the input device may include a device, such as a microphone, a keyboard, a mouse, a camera, etc. The output device may be a device such as a display for displaying a communication session of an application, a speaker, a tactile response provider (e.g., a motor, etc.), etc. For another example, the input and output interface 214 may allow for interfacing with a device, such as a touch screen, in which an input function and an output function are integrated into one. Specifically, in processing an instruction of a computer program loaded into the memory 211, the processor 212 of the electronic device 110 may display a service screen, content, etc., configured using data provided from the server 150 and/or the electronic device 120, on a display of the electronic device 110 through the input and output interface 214.

Also, in some example embodiments, the electronic device 110 may include more or less constituent components than those shown in FIG. 2. The server 150 may include more or less constituent components than those shown in FIG. 2. For example, the electronic device 110 may be implemented to include at least some of components of the above-mentioned input and output device 215, or may further include other components such as a transceiver, a global positioning system (GPS) module, a camera, various sensors, a database, etc.

Figure 3:
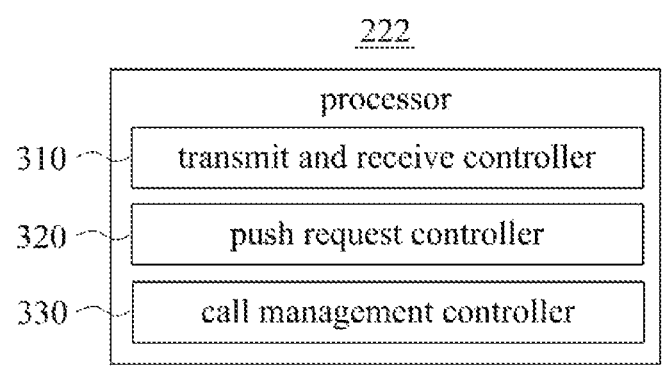
FIG. 3 is a block diagram illustrating a detailed configuration of at least one processor of a voice over internet protocol (VoIP) server according to at least one example embodiment of the inventive concepts.
Figure 4:
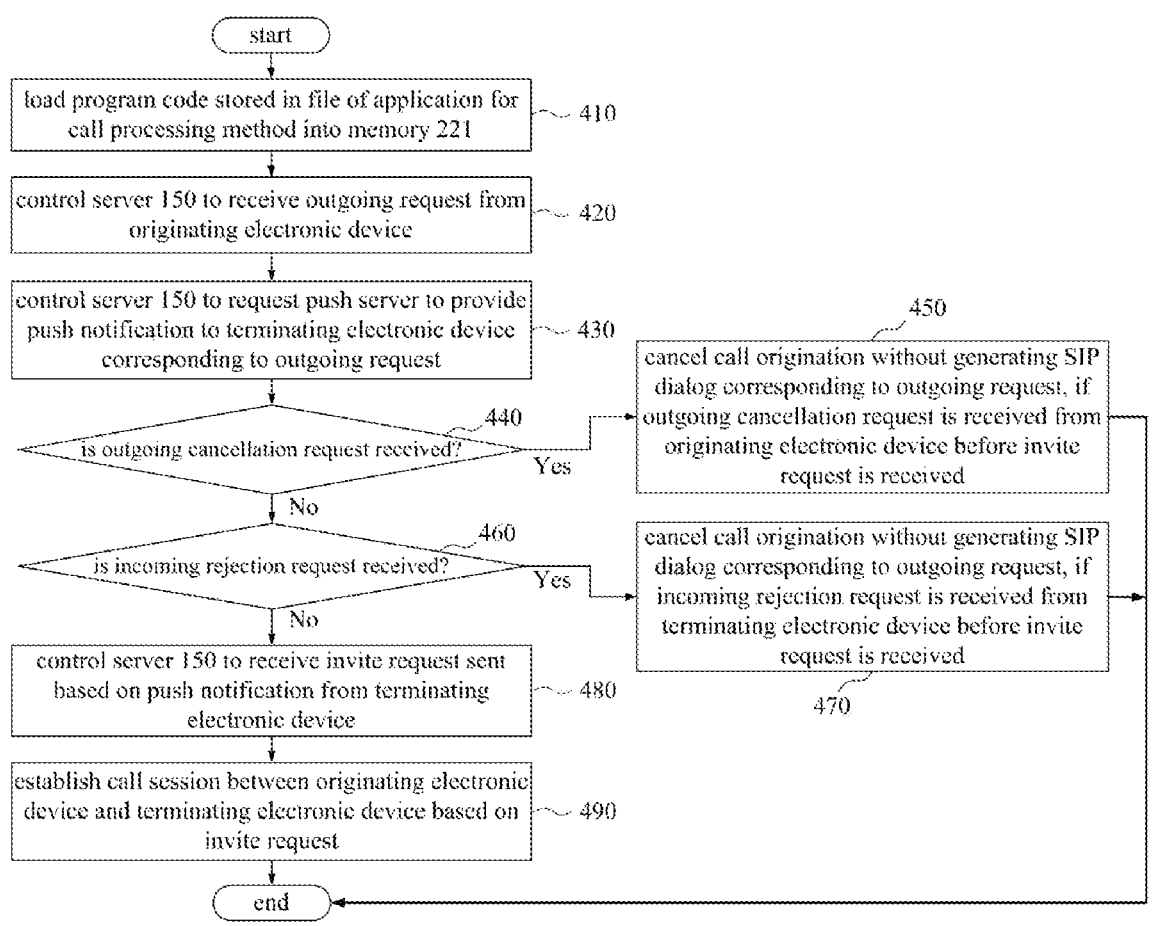
FIG. 4 is a flowchart illustrating a call processing method performed by a VoIP server according to at least one example embodiment of the inventive concepts.

FIG. 3 is a block diagram illustrating a detailed configuration of at least one processor of a VoIP server according to at least one example embodiment of the inventive concepts. FIG. 4 is a flowchart illustrating a call processing method performed by a VoIP server according to at least one example embodiment of the inventive concepts.

In at least one example embodiment, a server 150 of FIG. 2 may correspond to a VoIP server (and/or a SIP server). At least one processor 222 of the server 150 may include a transmit and receive controller 310, a push request controller 320, and a call management controller 330. The processor 222 and the components of the processor 222 may control the server 150 to perform operations 410 to 490 included in a call processing method of FIG. 4 according to at least one example embodiment, but is not limited thereto. For example, the processor 222 and the components of the processor 222 may be implemented to execute computer readable instructions received from an operating system (OS) and at least one program code included in a memory 221 of the server 150, thereby transforming the processor 222 into a special purpose processor.

In operation 410, the processor 222 may load a program code stored in a program file for the call processing method into the memory 221, for example, a program may be installed in the server 150 based on the program file.

According to at least one example embodiment, if the program installed in the server 150 is executed, the processor 222 may load the program code into the memory 221. According to at least one example embodiment, each of the transmit and receive controller 310, the push request controller 320, and the call management controller 330 included in the processor 222 may be implemented to execute computer readable instructions based on a corresponding code among the program codes loaded into the memory 221 and to execute the subsequent operations 420 to 490.

Moreover, the components of the processor 222 controlling the server 150 may be understood as (and referred herein as) the processor 222 controlling the other components of the server 150. For example, the processor 222 may control a communication module 223 of FIG. 2 included in the server 150 to control the server 150 to communicate with an electronic device (e.g., an electronic device 110 of FIG. 1) and/or another server such as a push server (e.g., a server 160 of FIG. 1).

In operation 420, the transmit and receive controller 310 may control the server 150 to receive an outgoing request from an originating electronic device. In other words, an invite request is sent by the originating electronic device (e.g., electronic device 110, etc.) to a VoIP server (and/or a SIP server) (e.g., server 150) to generate a SIP dialog and establish a call session in an outgoing request process in a SIP. However, according to at least one example embodiment of the inventive concepts, the invite request operation may be omitted.

In operation 430, the push request controller 320 may control the VoIP server 150 to transmit a request to a push server (e.g., server 160) to provide one or more push notifications to at least one terminating electronic device corresponding to the outgoing request (e.g., electronic device 120, etc.). For example, the outgoing request may include information for identifying the terminating electronic device, such as a telephone number associated with the terminating electronic device, a SIP address associated with the terminating electronic device, an IP address associated with the terminating electronic device, an account identifier associated with the terminating electronic device and/or a user of the terminating electronic device, other unique identifier associated with the terminating electronic device and/or a user of the terminating electronic device, etc. The server 150 may send a request to provide push notifications to the terminating electronic device 120 to the push server 160 based on this information. The push server 160 may provide the push notification to the terminating electronic device 120 based on this request. For example, an application associated with the push server 160 may be installed in the terminating electronic device 120. According to at least one example embodiment, the push server 160 may push the push notification to the terminating electronic device 120 through the application installed in the terminating electronic device 120 based on the request. The application installed in the terminating electronic device 120 may be installed in the originating electronic device 110 in the same way. The originating electronic device 110 and the terminating electronic device 120 may process a VoIP call, a SIP call, a video chat, a voice only chat, text messaging, SMS messaging, instant messaging, file transfers, etc., through this application.

In operation 440, the call management controller 330 may determine whether an outgoing cancellation request is received. For example, the call management controller 330 may determine whether an outgoing cancellation request is received from the originating electronic device 110 before an invite request is received. If the outgoing cancellation request is received, operation 450 may be performed. If the outgoing cancellation request is not received, operation 460 may be performed.

If the outgoing cancellation request is received from the originating electronic device 110 before an invite request is received, in operation 450, the call management controller 330 may cancel the call origination without generating a SIP dialog that corresponds to the outgoing request. If the call origination is cancelled, the call processing method of FIG. 4 may be ended.

In operation 460, the call management controller 330 may determine whether an incoming rejection request is received. For example, the call management controller 330 may determine whether an incoming rejection request is received from the terminating electronic device 120 before an invite request is received. If the incoming rejection request is received, operation 470 may be performed. If the incoming rejection request is not received, operation 480 may be performed.

In operation 470, if the incoming rejection request is received from the terminating electronic device 120 before the invite request is received, the call management controller 330 may cancel call origination without generating a SIP dialog corresponding to the outgoing request. If the call origination is ended, the call processing method of FIG. 4 may be ended.

In other words, operations 450 and 460 may be performed, if the outgoing cancellation request is received from the originating electronic device 110. Operations 460 and 470 may be performed, if the incoming rejection request is received from the terminating electronic device 120. Therefore, if the outgoing cancellation request or the incoming rejection request is not received, operation 480 may be performed from operation 430.

In operation 480, the transmit and receive controller 310 may control the VoIP server and/or the SIP server (e.g., the server 150) to receive an invite request sent based on the push notification from the terminating electronic device (e.g., electronic device 120). If the terminating electronic device 120 responds to a call termination, this invite request may be generated in the terminating electronic device 120 and be then sent to the server 150.

In operation 490, the call management controller 330 may establish a call session between the originating electronic device (e.g., electronic device 110) and the terminating electronic device (e.g., electronic device 120) based on the invite request. Also, the call management controller 330 may control the VoIP and/or SIP server (e.g., server 150) to send an invite request to the originating electronic device (e.g., electronic device 110) as the invite request is received from the terminating electronic device (e.g., electronic device 120). According to at least one example embodiment, the originating electronic device 110 may connect to the call session based on the invite request from the VoIP and/or SIP server 150. Also, the call management controller 330 may generate and manage a SIP dialog as the invite request is received from the terminating electronic device 120.

Also, the call processing method of FIG. 4 may further include an operation (not shown) of generating and managing a SIP dialog as an invite request is received before or after operation 490. This operation (not shown) may be performed by the call management controller 330 according to at least one example embodiment.

As such, according to at least one example embodiment of the inventive concepts, the invite request may be generated only when the terminating electronic device responds to a call termination request. Therefore, since it is not required and/or unnecessary for the VoIP and/or SIP server (e.g., server 150) to generate invite requests for every call originating request, the number of SIP dialogs the VoIP and/or SIP server generates is considerably decreased, thereby reducing the computer processing load on the VoIP and/or SIP server, reducing the memory and storage resources required for the VoIP and/or SIP server, and reducing the amount of network traffic generated in response to a VoIP and/or SIP call originating request. For example, if the ratio of an incoming response to an outgoing request is 50%, the number of SIP dialogs the server 150 generates may be reduced by half. Therefore, the performance and capacity of the server 150 is greatly improved.

Although the originating electronic device (e.g., electronic device 110) does not send the invite request to the VoIP and/or SIP server (e.g., server 150), the VoIP and/or SIP server may send a call request to the terminating electronic device (e.g., electronic device 120) by sending a push notification through the push server (e.g., server 160) to the terminating electronic device (e.g., electronic device 120).

Additionally, while the call processing method of FIG. 4 is discussed with regard to two electronic devices and two servers, the example embodiments are not limited thereto and the call processing method may be performed with lesser and/or greater electronic devices and/or servers. For example, the call processing method may be performed with three or more electronic devices and a single server that implements the functionality of the VoIP server and the push server, etc.

Figure 5:
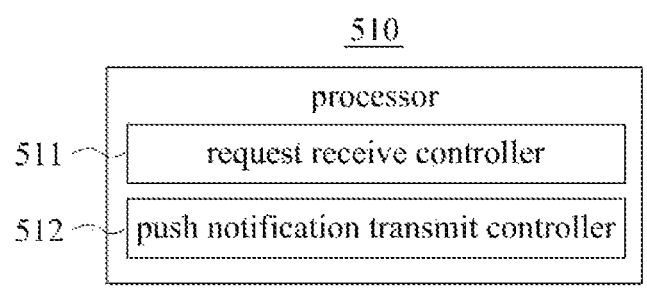
FIG. 5 is a block diagram illustrating a detailed configuration of at least one processor of a push server in at least one example embodiment of the inventive concepts.
Figure 6:
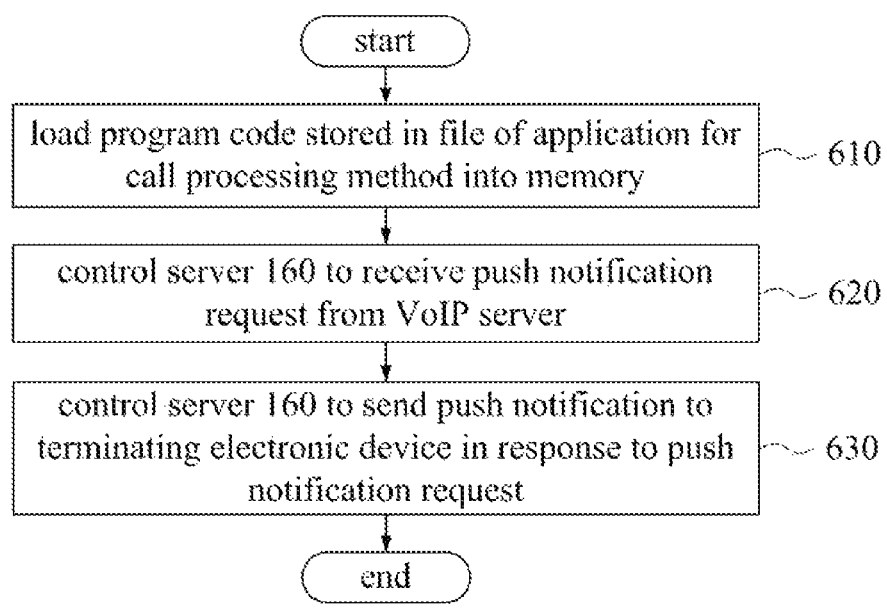
FIG. 6 is a flowchart illustrating a call processing method performed by a push server according to at least one example embodiment of the inventive concepts.

FIG. 5 is a block diagram illustrating a detailed configuration of at least one processor of a push server according to at least one example embodiment of the inventive concepts. FIG. 6 is a flowchart illustrating a call processing method performed by a push server according to at least one example embodiment of the inventive concepts.

In at least one example embodiment, a server 160 of FIG. 1 may correspond to a push server. At least one processor 510 of the server 160 may include a request receive controller 511 and a push notification transmit controller 512. This processor 510 and the components of the processor 510 may control the server 160 to perform operations 610 to 630 included in a call processing method of FIG. 6 according to at least one example embodiment, but is not limited thereto. For example, the processor 510 and the components of the processor 510 may be implemented to execute computer readable instructions based on an OS and at least one program code included in a memory (not shown) of the server 160 thereby transforming the at least one processor 510 into a special purpose processor.

In operation 610, the processor 510 may load a program code stored in a program file for the call processing method into the memory of the server 160. For example, a program may be installed in the server 160 based on the program file. According to at least one example embodiment, if the program installed in the server 160 is executed, the processor 510 may load the program code into memory. Each of the request receive controller 511 and the push notification transmit controller 512 included in the processor 510 may be implemented to execute an instruction based on a corresponding code among the program codes loaded into the memory to execute subsequent operations 620 and 630.

In operation 620, the request receive controller 511 may control the server 160 to receive a push notification request from a VoIP and/or SIP server (e.g., server 150). According to at least one example embodiment, the push notification request may be generated by the VoIP and/or SIP server 150 for a terminating electronic device (e.g., electronic device 120) corresponding to an outgoing request from an originating electronic device (e.g., electronic device 110).

In operation 630, the push notification transmit controller 512 may control the push server 160 to send push notification to the terminating electronic device 120 in response to the push notification request. According to at least one example embodiment, the terminating electronic device 120 may send an invite request to the VoIP and/or SIP server 150 based on the push notification. The VoIP and/or SIP server 150 may establish a call session between the originating electronic device 110 and the terminating electronic device 120 based on the invite request.

An application associated with the push server (e.g., push server 160) may be installed in the terminating electronic device (e.g., electronic device 120). The push notification may be pushed to the terminating electronic device (e.g., electronic device 120) through this application.

Additionally, while the call processing method of FIG. 6 is discussed with regard to two electronic devices and two servers, the example embodiments are not limited thereto and the call processing method may be performed with lesser and/or greater electronic devices and/or servers. For example, the call processing method may be performed with three or more electronic devices and a single server that implements the functionality of the VoIP server and the push server, etc.

Figure 7:
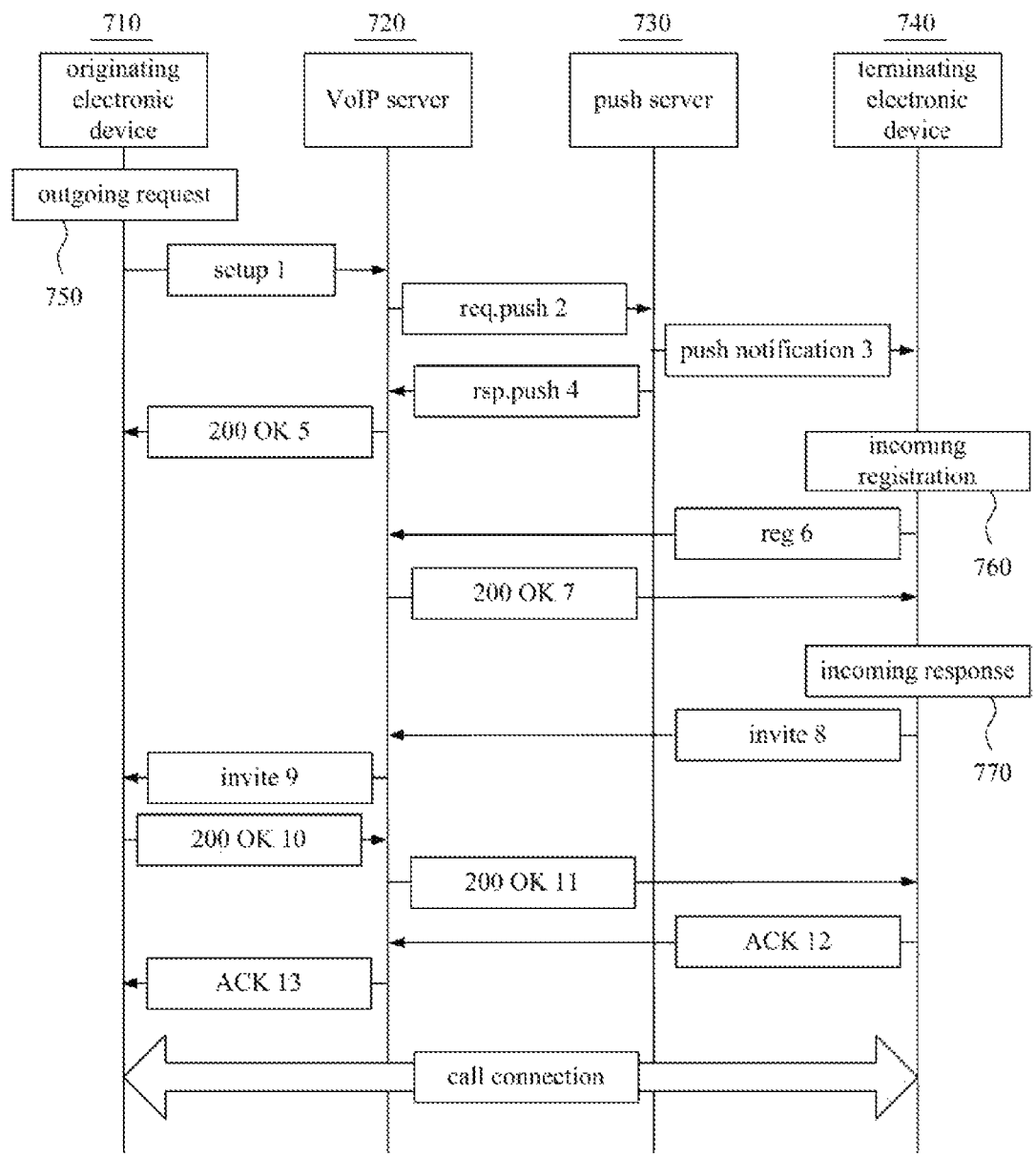
FIG. 7 is a signal sequence diagram illustrating call processing in a call processing system according to at least one example embodiment of the inventive concepts.

FIG. 7 is a signal sequence diagram illustrating call processing of the call processing system according to at least one example embodiment of the inventive concepts. In FIG. 7, a process of communicating a message among an originating electronic device 710, a VoIP server 720, a push server 730, and a terminating electronic device 740 is depicted, but the example embodiments are not limited thereto and may include, for example, a call session including more than two electronic devices. According to some example embodiments, the VoIP server 720 may be a SIP server. A setup process 1 may be a process where the originating electronic device 710 sends an outgoing request 750 to the VoIP server 720 as the outgoing request 750 is generated on the originating electronic device 710. A "req.push" process 2 may be a process where the VoIP server 720 requests that the push server 730 send at least one push notification to the terminating electronic device 740 corresponding to the outgoing request received by the VoIP server 720. A push notification process 3 may be a process where the push server 730 provides the push notification to the terminating electronic device 740 based on the request of the VoIP server 720. A "rsp.push" process 4 may be a response process where the push server 730 transmits a message informing the VoIP server 720 that the request of the VoIP server 720 is processing/has been processed. A 200 OK process 5 may be a response process where the VoIP server 720 transmits a message informing the originating electronic device 710 that the request of the originating electronic device 710 is processing/has been processed. Herein, it is well known that the term "200 OK" is a response message defined in the SIP protocol.

According to at least one example embodiment, if the terminating electronic device 740 performs incoming registration 760 based on the push notification, a "reg process" 6 may be performed.

The reg process 6 may be a process where the terminating electronic device 740 registers itself in the VoIP server 720. This registration is such that the terminating electronic device 740 transmits a message informing the VoIP server 720 of itself. Since a SIP dialog is not generated, the VoIP server 720 may not know of the relationship (e.g., the relationship is not registered) between the originating electronic device 710 and the terminating electronic device 740 yet.

A 200 OK process 7 may be a response process where the VoIP server 720 transmits a message informing the terminating electronic device 740 that the registration of the terminating electronic device 740 is processing/has been processed.

According to at least one example embodiment, if the terminating electronic device 740 performs an incoming response 770, an invite process 8 is generated and performed.

The invite process 8 may be a process where the terminating electronic device 740 sends an invite request to the VoIP server 720. According to at least one example embodiment, the VoIP server 720 may generate and manage a SIP dialog based on the invite request.

An invite process 9 may be a process where the VoIP server 720 sends the invite request to the originating electronic device 710. For example, the VoIP server 720 may send (and/or forward) the invite request, sent from the terminating electronic device 740, to the originating electronic device 710.

A 200 OK process 10 may be a response process where the originating electronic device 710 sends a response to the invite request to the VoIP server 720.

A 200 OK process 11 may be a response process where the VoIP server 720 sends a response to the invite request to the terminating electronic device 740.

An acknowledgement (ACK) process 12 may be a response process where the terminating electronic device 740 sends an ACK to the VoIP server 720.

An ACK process 13 may be a response process where the VoIP server 720 sends the ACK to the originating electronic device 710.

The originating electronic device 710 and the terminating electronic device 740 may connect to a call session, established based on the invite request by the VoIP server 720, through this process and may proceed with a call connection between the originating electronic device 710 and the terminating electronic device 740.

If the invite request from the terminating electronic device 740 based on the incoming response 770 is not received, the VoIP server 720 does not generate the SIP dialog. Therefore, the performance of the VoIP server 720 may be considerably improved based on the number of outgoing requests received by the VoIP (and/or SIP) server. Additionally, while the call processing method of FIG. 7 is discussed with regard to two electronic devices and two servers, the example embodiments are not limited thereto and the call processing method may be performed with lesser and/or greater electronic devices and/or servers. For example, the call processing method may be performed with three or more electronic devices and a single server that implements the functionality of the VoIP server and the push server, etc.

Figure 8:
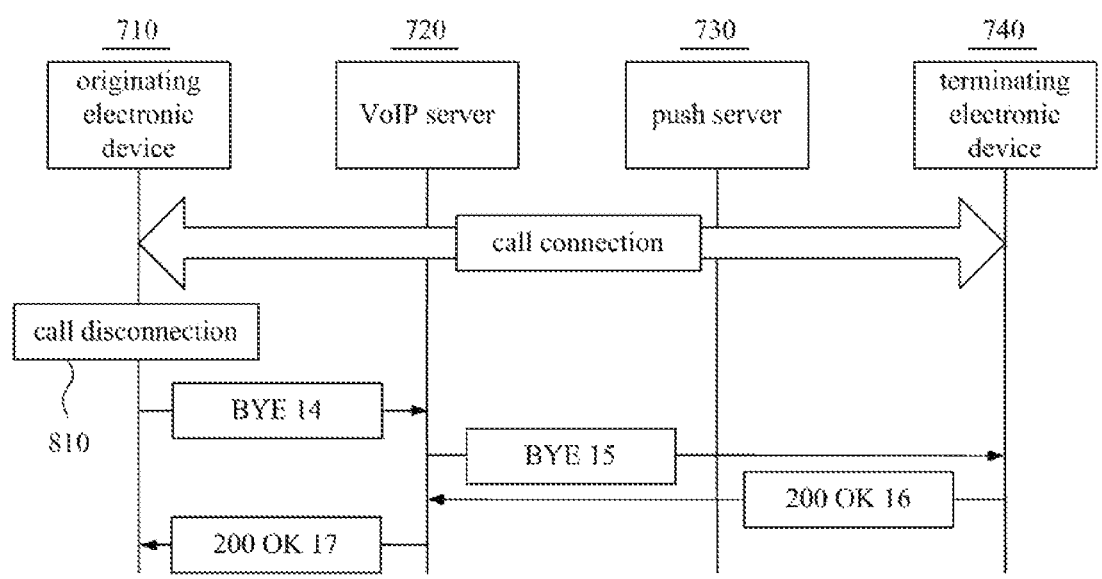
FIG. 8 is a signal sequence diagram illustrating an outgoing end process in a call processing system according to at least one example embodiment of the inventive concepts.

FIG. 8 is a signal sequence diagram illustrating an outgoing end process in a call processing system according to at least one example embodiment of the inventive concepts. FIG. 8 illustrates a process where an originating electronic device 710 requests a call disconnection 810 after a call connection between the originating electronic device 710 and a terminating electronic device 740 proceeds, but the example embodiments are not limited thereto and may include, for example, a call session including more than two electronic devices and/or a single server, etc.

A BYE process 14 may be a process where the originating electronic device 710 sends an outgoing BYE message to the VoIP server 720. In some example embodiments, the VoIP server 720 may be a SIP server. It is well known that the term "BYE" is a BYE message defined in the SIP protocol.

A BYE process 15 may be a process where the VoIP server 720 sends the BYE message, received from the originating electronic device 710, to the terminating electronic device 740.

A 200 OK process 16 may be a response process where the terminating electronic device 740 sends a response based on the reception of the BYE message to the VoIP server 720.

A 200 OK process 17 may be a response message where the VoIP server 720 sends a response to the originating electronic device 710.

After this process, the call connection between the originating electronic device 710 and the terminating electronic device 740 may be terminated. If the terminating electronic device 740 is the first party to request a call disconnection, the terminating electronic device 740 may send a BYE message to the VoIP server 720. The VoIP server 720 may send the BYE message to the originating electronic device 710, thus terminating the call connection. If the originating electronic device 710 is the first party to request a call disconnection, the roles of the originating electronic device 710 and the terminating electronic device 740 may be reversed.

Figure 9:
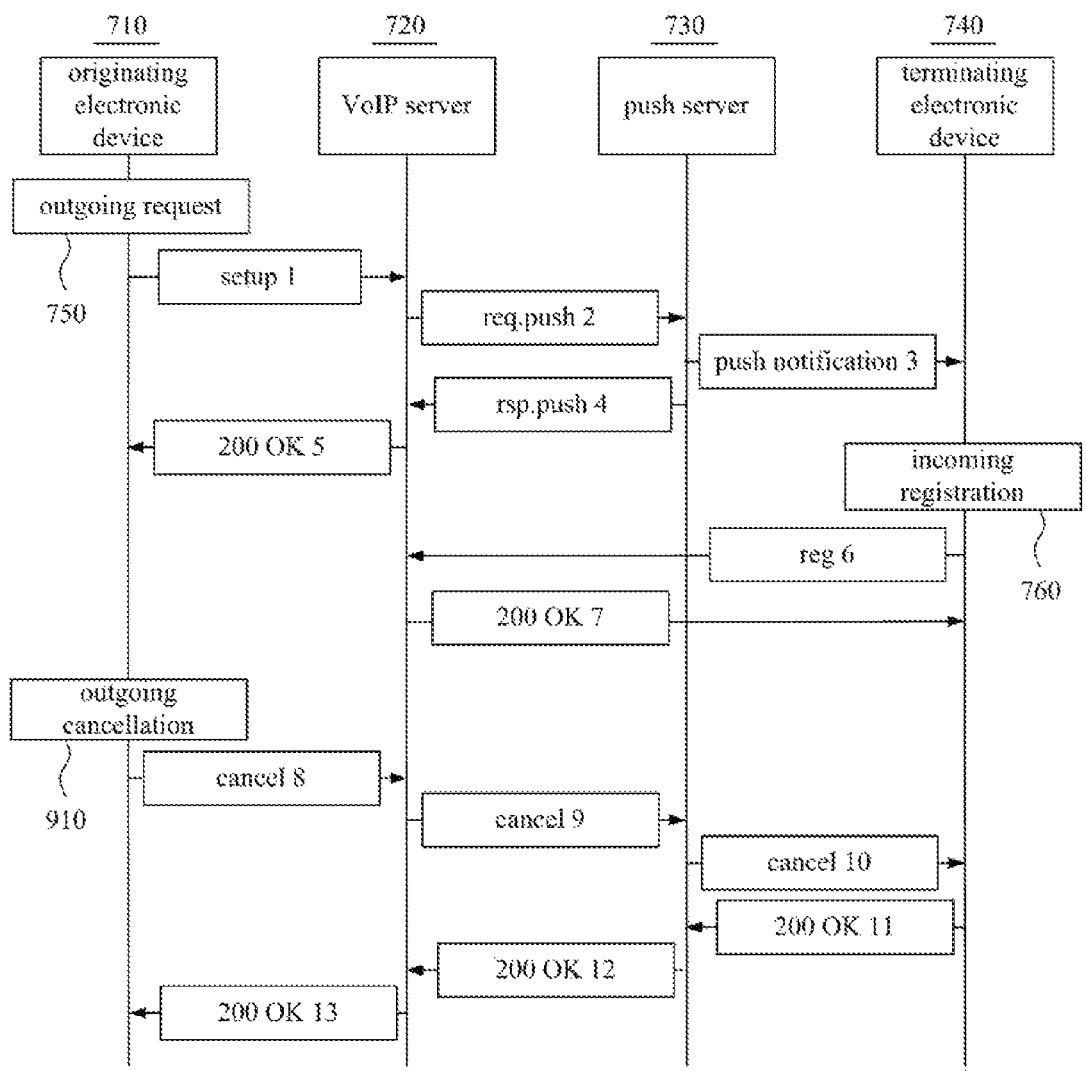
FIG. 9 is a signal sequence diagram illustrating an outgoing cancellation process in a call processing system according to at least one example embodiment of the inventive concepts.

FIG. 9 is a signal sequence diagram illustrating an outgoing cancellation process in a call processing system according to at least one example embodiment of the inventive concepts. FIG. 9 illustrates at least one example embodiment in which an originating electronic device 710 requests outgoing cancellation 910 after a 200 OK process 7 is performed based on incoming registration 760 of FIG. 7, but the example embodiments are not limited thereto and may include, for example, a call session including more than two electronic devices and/or a single server, etc.

A cancel process 8 may be a process where the originating electronic device 710 sends an outgoing cancellation message to a VoIP server 720.

A cancel process 9 may be a process where the VoIP server 720 sends the outgoing cancellation message to the push server 730.

A cancel process 10 may be a process where the push server 730 sends the outgoing cancellation message to a terminating electronic device 740.

In other words, the VoIP server 720 does not receive an invite request and does not generate a SIP dialog. Therefore, since the outgoing cancellation 910 occurs, the VoIP server 720 may send the origination cancellation message to the terminating electronic device 740 through the push server 730.

A 200 OK process 11, a 200 OK process 12, and a 200 OK process 13 may be a process of sending a response of the terminating electronic device 740 to the originating electronic device 710 through the push server 730 and the VoIP server 720.

Accordingly, if the outgoing cancellation 910 occurs, an invite request is not generated. Therefore, a SIP dialog is not generated.

Figure 10:
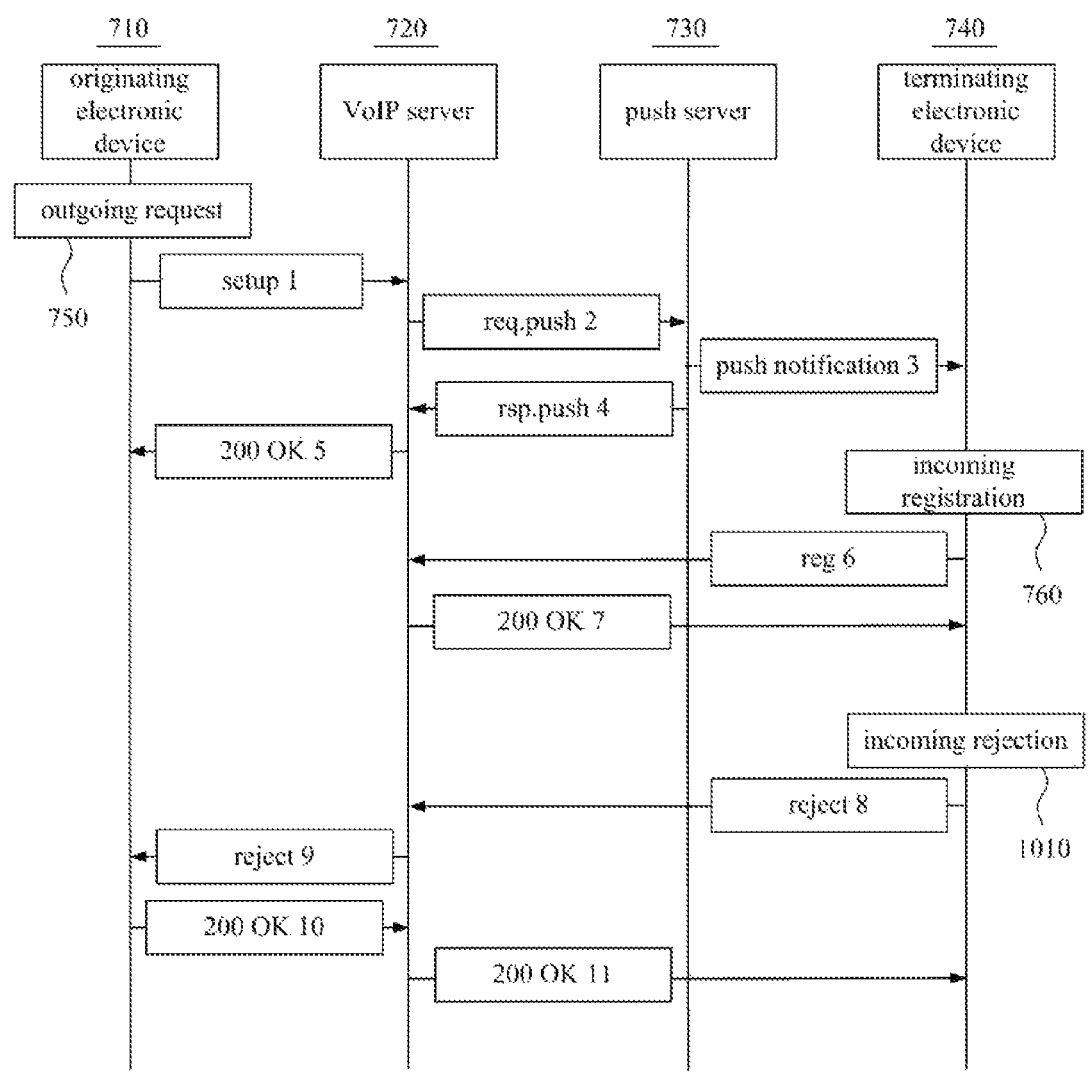
FIG. 10 is a signal sequence diagram illustrating an incoming rejection process in a call processing system according to at least one example embodiment of the inventive concepts.

FIG. 10 is a signal sequence diagram illustrating an incoming rejection process in a call processing system according to at least one example embodiment of the inventive concepts. In FIG. 10, at least one example embodiment is depicted as a terminating electronic device 740 requests incoming rejection 1010 after a 200 OK process 7 is performed based on incoming registration 760 of FIG. 7, but the example embodiments are not limited thereto and may include, for example, a call session including more than two electronic devices and/or a single server, etc.

A reject process 8 may be a process where the terminating electronic device 740 may send an incoming rejection message to a VoIP server 720.

A reject process 9 may be a process where the VoIP server 720 sends the incoming rejection message to an originating electronic device 710.

A 200 OK process 10 and a 200 OK process 11 may be a process of transmitting a response of the originating electronic device 710 to the terminating electronic device 740 through the VoIP server 720.

As such, if the incoming rejection 1010 occurs, an invite request is not generated. Therefore, the SIP dialog is not generated.

As such, according to at least one example embodiment of the inventive concepts, the system reduces the number of times a SIP dialog is generated by generating an invite request only if the terminating electronic device accepts a call connection. Thus the performance and capacity of the VoIP (and/or SIP server) is improved.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A call processing system, the system comprising:
   a memory having computer-readable instructions stored thereon; and
   at least one processor configured to execute the computer-readable instructions to,
   receive an outgoing request for a session initiation protocol (SIP) call session from an originating electronic device,
   transmit a push request corresponding to the outgoing request of the originating electronic device to a push server, the push request causing the push server to provide a push notification to a terminating electronic device, prior to generation of a SIP dialog corresponding to the outgoing request,
   control to receive a SIP invite request from the terminating electronic device to the originating electronic device in response to the push notification and a determination that an outgoing cancellation request is not received from the originating electronic device after the outgoing request is transmitted from the originating electronic device and before the SIP invite request is received by the originating electronic device from the terminating electronic device, and
   establish the SIP call session between the originating electronic device and the terminating electronic device based on the SIP invite request from the terminating electronic device to the originating electronic device, and the determination that the outgoing cancellation request is not received from the originating electronic device before the SIP invite request is received from the terminating electronic device, the establishing the SIP call session including generating the SIP dialog corresponding to the outgoing request,
   wherein the outgoing cancellation request causes the outgoing request for the SIP call session to be cancelled when the outgoing cancellation request is received from the originating electronic device before the SIP invite request is received from the terminating electronic device.

2. The call processing system of claim 1, wherein the at least one processor is further configured to:
   forward the SIP invite request to the originating electronic device when the SIP invite request is received from the terminating electronic device; and
   wherein the originating electronic device is configured to connect to the SIP call session based on the SIP invite request from the push server.

3. The call processing system of claim 1, wherein the at least one processor is configured to:
   generate the SIP dialog based on the SIP invite request received from the terminating electronic device; and
   manage the SIP dialog between the terminating electronic device and the originating electronic device.

4. The call processing system of claim 1, wherein the at least one processor is configured to cancel SIP call origination without generating the SIP dialog corresponding to the outgoing request, in response to the outgoing cancellation request being received from the originating electronic device before the SIP invite request is received from the terminating electronic device.

5. The call processing system of claim 1, wherein the at least one processor is configured to cancel SIP call origination without generating the SIP dialog corresponding to the outgoing request, in response to an incoming rejection request being received from the terminating electronic device before the SIP invite request is received from the terminating electronic device.

6. A call processing method, the method comprising:
   receiving, using at least one processor, an outgoing request for a session initiation protocol (SIP) call session from an originating electronic device;
   requesting, using the at least one processor, a push notification from a push server to a terminating electronic device corresponding to the outgoing request of the originating electronic device, the requesting the push notification causing the push server to provide the push notification to the terminating electronic device prior to generation of a SIP dialog corresponding to the outgoing request;
   controlling to receive, using the at least one processor, a SIP invite request from the terminating electronic device to the originating electronic device in response to the push notification and a determination that an outgoing cancellation request is not received from the originating electronic device after the outgoing request is transmitted from the originating electronic device and before the SIP invite request is received by the originating electronic device from the terminating electronic device; and
   establishing, using the at least one processor, the SIP call session between the originating electronic device and the terminating electronic device based on the SIP invite request from the terminating electronic device to the originating electronic device, and the determination that the outgoing cancellation request is not received from the originating electronic device before the SIP invite request is received from the terminating electronic device, the establishing the SIP call session including generating the SIP dialog corresponding to the outgoing request, wherein the outgoing cancellation request causes the outgoing request for the SIP call session to be cancelled when the outgoing cancellation request is received from the originating electronic device before the SIP invite request is received from the terminating electronic device.

7. The call processing method of claim 6, wherein the establishing of the call session comprises:

sending the SIP invite request to the originating electronic device when the SIP invite request is received from the terminating electronic device; and wherein the originating electronic device is configured to connect to the SIP call session based on the SIP invite request from a VoIP server.

8. The call processing method of claim 6, further comprising:

generating, using the at least one processor, the SIP dialog when the SIP invite request is received from the terminating electronic device; and managing, using the at least one processor, the SIP dialog between the originating electronic device and the terminating electronic device.

9. The call processing method of claim 6, further comprising:

cancelling, using the at least one processor, SIP call origination without generating the SIP dialog corresponding to the outgoing request, in response to the outgoing cancellation request being received from the originating electronic device before the SIP invite request is received from the terminating electronic device.

10. The call processing method of claim 6, further comprising:

cancelling, using the at least one processor, SIP call origination without generating the SIP dialog corresponding to the outgoing request, in response to an incoming rejection request being received from the terminating electronic device before the SIP invite request is received from the terminating electronic device.

11. The call processing system of claim 1, wherein the at least one processor is further configured to execute the computer-readable instructions to establish the SIP call session between the originating electronic device and the terminating electronic device further based on a determination that the originating electronic device has received the SIP invite request from the terminating electronic device, and an incoming rejection request is not received from the terminating electronic device before the SIP invite request is received from the terminating electronic device.

12. The call processing system of claim 1, wherein the at least one processor is further configured to execute the computer-readable instructions to receive the outgoing cancellation request from the originating electronic device;

transmit the outgoing cancellation request to the terminating electronic device through the push server; and cancel SIP call origination without generating the SIP dialog corresponding to the outgoing request, in response to the outgoing cancellation request being transmitted from the originating electronic device to the terminating electronic device through the push server.

13. The call processing system of claim 1, wherein the at least one processor is further configured to execute the computer-readable instructions to receive a registration request message from the terminating electronic device in response to the push notification being transmitted to the terminating electronic device; and register the terminating electronic device in the call processing system in response to the registration request message.

14. The call processing system of claim 1, wherein the at least one processor is further configured to execute the computer-readable instructions to perform the determination while the originating electronic device is awaiting a response to the outgoing request that has been transmitted to the terminating electronic device.

* * * * *